(12) United States Patent
MacLeod et al.

(10) Patent No.: US 6,923,289 B1
(45) Date of Patent: Aug. 2, 2005

(54) CLOSED CIRCUIT STEERING CIRCUIT FOR MOBILE VEHICLES

(75) Inventors: Ian J. C. MacLeod, Ames, IA (US); Rick J. Sporrer, Nevada, IA (US)

(73) Assignee: Sauer-Danfoss, Inc., Ames, IA (US)

( * ) Notice: Subject to any disclaimer, the term of this patent is extended or adjusted under 35 U.S.C. 154(b) by 18 days.

(21) Appl. No.: 10/660,005

(22) Filed: Sep. 11, 2003

(51) Int. Cl.$^7$ .............................................. B62D 5/06
(52) U.S. Cl. .................................................... 180/403
(58) Field of Search ............................... 180/403, 417, 180/421, 422, 423

(56) References Cited

U.S. PATENT DOCUMENTS

| | | | |
|---|---|---|---|
| 3,011,579 A | 12/1961 | Milliken, Jr. | |
| 3,016,708 A | * 1/1962 | Gordon et al. | ................. 60/384 |
| 4,020,867 A | 5/1977 | Sumiyoshi | |
| 4,409,789 A | 10/1983 | Hansen et al. | |
| 4,578,948 A | 4/1986 | Hutson et al. | |
| 4,628,690 A | 12/1986 | Arai et al. | |
| 4,640,094 A | * 2/1987 | Wittren | ......................... 60/385 |
| 4,865,144 A | 9/1989 | North | |
| 4,914,592 A | 4/1990 | Callahan et al. | |
| 5,267,627 A | * 12/1993 | Frank et al. | ................. 180/422 |
| 5,273,129 A | 12/1993 | Wright et al. | |
| 6,068,013 A | 5/2000 | Arai et al. | |

* cited by examiner

Primary Examiner—Kevin Hurley

(57) ABSTRACT

A closed-circuit pump is provided that receives input from a steering unit in order to drive a steering cylinder. The closed-circuit pump is preferably a proportional bi-directional pump. The steering unit includes a steering wheel or similar device controlled by an operator. In one embodiment, the steering unit is a conventional hydraulic system that includes a servo pump. In another embodiment, the steering unit is an electronic displacement control system. The steering cylinder engages with a steering assembly to perform the steering function by physically turning the wheels of the vehicle. The inlet of the steering cylinder includes a counterbalance valve, which prevents flow into the steering cylinder when there is no steering input from the operator.

5 Claims, 2 Drawing Sheets

CLOSED CIRCUIT STEERING CIRCUIT FOR MOBILE VEHICLES

BACKGROUND OF THE INVENTION

This invention relates generally to a steering system and, more particularly, to a closed circuit, hydraulic steering system for mobile vehicles.

Hydraulic steering units typically consist of an open-circuit pump that provides hydraulic pressure to a steering unit. The steering unit, in turn, actuates one or more steering cylinders, which control the steering of a vehicle. In some conventional designs, the open-circuit pump is dedicated completely to the steering system and provides full pressure to the steering unit. In such a design, the steering unit distributes the hydraulic fluid flow to the steering cylinders. In other conventional designs, the open-circuit pump is used for several hydraulic systems and includes a priority valve to divert flow to the steering system.

One disadvantage of conventional hydraulic steering units is their large physical size. Because of the need for an open-circuit pump, which utilizes a reservoir, and because of the linear configuration of the steering system, conventional steering units take up a considerable amount of space.

Another disadvantage of conventional hydraulic steering units is that they tend to operate at relatively high pressure levels. Typically, open-circuit pumps deliver about 1800 liters per minute of hydraulic fluid to the steering system at a pressure between 200–250 bar. This high pressure level is necessary for the open-circuit pump to drive the steering system. Such a high pressure level, however, results in substantial noise during operation.

It is therefore a principal object of this invention to provide a hydraulic steering system that occupies a minimum amount of space.

A further object of this invention is to provide a hydraulic steering system that requires a minimum amount of hydraulic pressure for operation.

Still another object of this invention is to provide a hydraulic steering system that operates with a minimum amount of operational noise.

These and other objects will be apparent to those skilled in the art.

BRIEF SUMMARY OF THE INVENTION

The present invention is directed toward a closed circuit hydraulic steering system for mobile vehicles. The system consists of a closed-circuit pump that receives input from a steering unit in order to drive a steering cylinder. The closed-circuit pump is a proportional bi-directional pump.

The steering unit includes a steering wheel or similar device controlled by an operator. In one embodiment, the steering unit is a conventional hydraulic system that includes a servo pump. In another embodiment, the steering unit is an electronic displacement control system.

The steering cylinder engages the steering assembly to perform the steering function by physically turning the wheels of the vehicle. The inlet of the steering cylinder includes a counterbalance valve, which prevents flow into the steering cylinder when there is no steering input from the operator.

DESCRIPTION OF THE INVENTION

Figure 1:
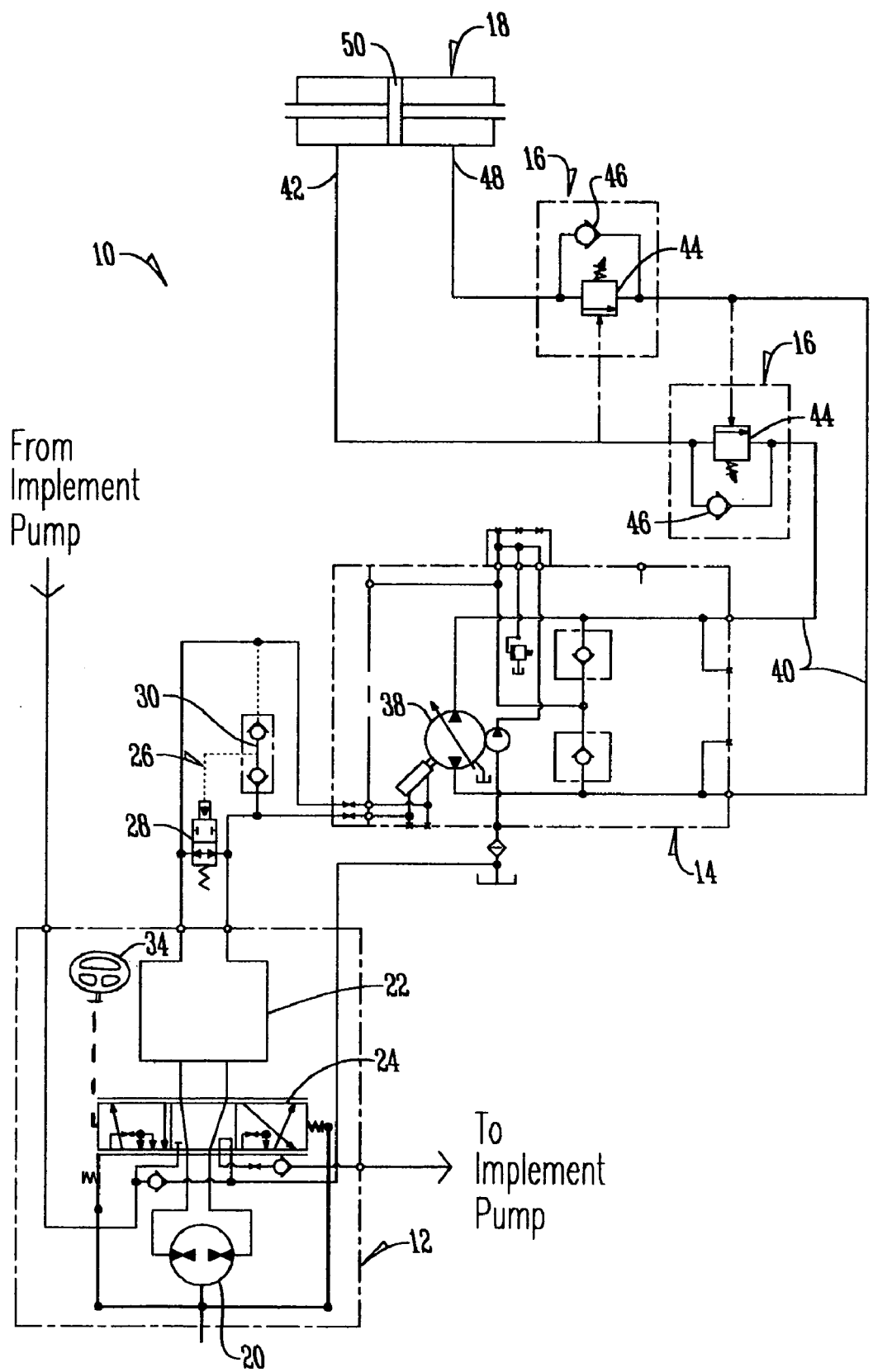
FIG. 1 is a process and instrument diagram of the present invention adapted for use with a hydraulic steering unit.

With reference to the drawings, the numeral 10 designates a closed-circuit hydraulic steering system for use in a vehicle. Hydraulic steering system 10 comprises a steering unit 12, a closed-circuit pump system 14, counterbalance valve 16 and a steering cylinder 18.

As shown in FIG. 1, steering unit 12 is a conventional hydraulic steering unit consisting of a servo pump 20 that creates servo pressure 22. The servo pressure 22 is directed by solenoid 24 and through return-to-neutral valve logic 26. Return-to-neutral valve logic 26 consists of a solenoid valve 28 that regulates the servo pressure through cross-check valves 30. The servo pressure 22 works to control the actuation of the closed-circuit pump system 14. Because the servo pressure 22 is only working to relay steering input to the closed-circuit pump system 14, its operating pressure is far less than the steering units associated with conventional open-circuit steering systems. Typically, the closed-circuit hydraulic steering system 10 uses a servo pressure 22 that flows at a rate of 10–12 liters per minute with a pressure between 20–30 bar. Because the servo pressure 22 is considerably lower in pressure and flow rate than conventional open-circuit steering systems, as discussed in the Background of the Invention, closed-circuit hydraulic steering system 10 emanates considerably less noise during operation.

Figure 2:
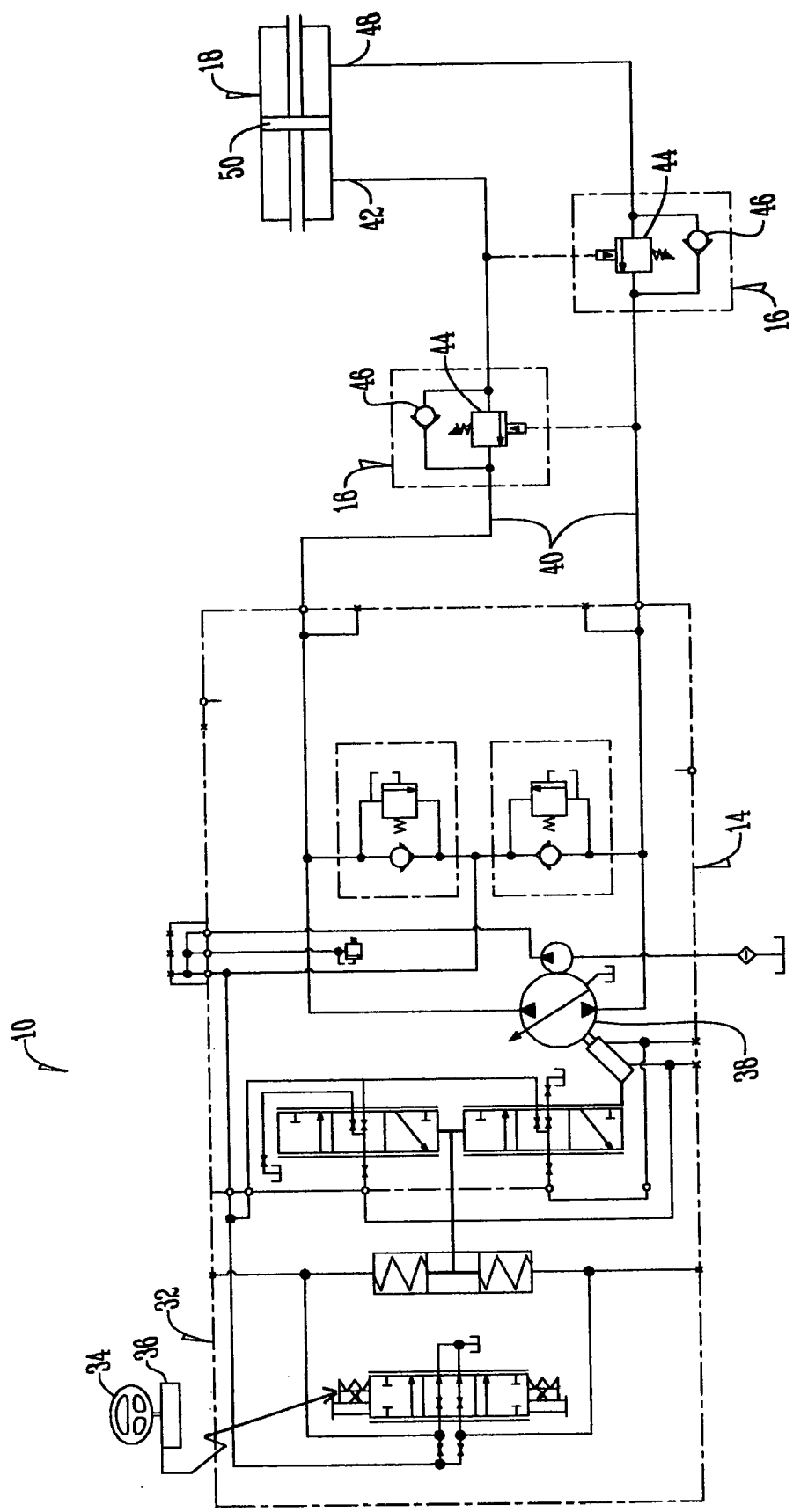
FIG. 2 is a process and instrument diagram of the present invention adapted for use with an electronic displacement control unit.

Alternatively, steering unit 12 comprises an electronic displacement control (EDC) 32 and a steering wheel 34 or joystick (not shown) equipped with electronic encoding devices 36, as shown in FIG. 2. EDC 32 uses electronic means to actuate the closed-circuit pump system 14. By interacting with a steering wheel 34 or joystick (not shown) equipped with electronic encoding devices 36, the operator can manipulate EDC 32 which, in turn, controls the closed-circuit pump system 14. The use of EDC 32 completely eliminates the need for hydraulic input between the operator and the closed-circuit pump system 14. As such, the physical size of the closed-circuit hydraulic steering system 10 is further reduced as there is no servo pump 20 and associated hydraulic components.

Closed-circuit pump system 14 includes hydrostatic pump 38. Hydrostatic pump 38 is a proportional bi-directional pump. Because hydrostatic pump 38 is within a closed circuit, there is no reservoir, as required by conventional open-circuit steering systems. The absence of a reservoir in closed-circuit pump system 14 drastically reduces the physical size of the hydraulic steering system 10. Further, the physical size of hydraulic steering system 10 also is reduced by the configuration of the hydraulic steering system 10, whereby closed-circuit pump system 14 is nested between steering unit 12 and steering cylinder 18.

Counterbalance valve 16 is located along inlet 42 of steering cylinder 18. Counterbalance valve 16 includes a solenoid 44 that controls flow of hydraulic fluid 40 through the inlet 42. When solenoid 44 is in its non-energized position, as shown in FIGS. 1 and 2, flow through inlet 42 is subject to check valve 46. As such, check valve 46 prevents hydraulic fluid 40 from seeping out of steering cylinder 18 when the hydraulic steering system 10 is at rest. This seepage, known as "drift," typically is caused by leakage within the hydrostatic pump when there is no steering input from the operator. Counterbalance valve 16 also resides on outlet 48 of steering cylinder 18. Placement of counterbalance valves 16 on both the inlet 42 and outlet 48 of steering cylinder 18 ensures that no drift occurs in hydraulic steering system 10.

Steering cylinder 18 includes piston 50. As shown in FIGS. 1 and 2, steering cylinder 18 is a dual-action cylinder whereby movement of piston 50 in either direction works to affect the steering of the vehicle. Alternatively, hydraulic steering system 10 may employ two single-action cylinders (not shown) to accomplish the same response.

In operation, the hydraulic steering system 10 works by steering input from the operator. The operator controls the system by manipulating a steering wheel 34 or joystick (not shown). In the first embodiment of hydraulic steering system 10, manipulation of the steering wheel 34 shifts solenoid 24, directing servo pressure 22 in such a way as to actuate closed-circuit pump system 14. In the second embodiment of hydraulic steering system 10, manipulation of the steering wheel 34 engages encoding devices 36 to electronically control EDC 32. Accordingly, EDC 32 directs the operation of closed-circuit pump system 14. Closed-circuit pump system 14 works to actuate steering cylinder 18, which ultimately steers the vehicle by turning the vehicle's wheels (not shown) appropriately. In the absence of steering input from the operator, counterbalance valve 16 engages to prevent hydraulic fluid 40 from seeping out of steering cylinder 18, thereby maintaining the steering position of the vehicle.

It is therefore seen that by the use of a closed circuit pump, this invention provides a hydraulic steering system that occupies a minimum amount of space, requires a minimum amount of hydraulic pressure for operation, and operates with a minimum amount of operational noise.

What is claimed is:

1. A hydraulic steering system for vehicles comprising:
   a hydraulic steering unit including a steering element for receiving steering input from an operator;
   a closed-circuit pump in communication with the steering unit wherein the steering unit actuates the closed-circuit pump;
   at least one steering cylinder in communication with the closed-circuit pump wherein the closed-circuit pump actuates the steering cylinder to control the steering of the vehicle; and
   said steering unit having at least one servo pump in communication with the closed-circuit pump to actuate the closed circuit pump.

2. The hydraulic steering system of claim 1 wherein the closed-circuit pump is a proportional bi-directional pump.

3. The hydraulic steering system of claim 1 wherein the steering cylinder includes at least one counterbalance valve along the inlet to the steering cylinder to prevent actuation of the steering cylinder when there is no steering input from the operator.

4. The hydraulic steering system of claim 1 wherein the steering element comprises a steering wheel.

5. A hydraulic steering system for vehicles comprising:
   a hydraulic steering unit including a steering element for receiving steering input from an operator;
   a closed-circuit pump in communication with the steering unit wherein the steering unit actuates the closed-circuit pump;
   at least one steering cylinder in communication with the closed-circuit pump wherein the closed-circuit pump actuates the steering cylinder to control the steering of the vehicle; and
   said steering cylinder having at least one counterbalance valve along the inlet to the steering cylinder to prevent actuation of the steering cylinder when there is no steering input from the operator.

* * * * *